H. BENTON.
FURNACE GRATE.
APPLICATION FILED APR. 18, 1912.
1,139,097.
Patented May 11, 1915.
4 SHEETS—SHEET 1.
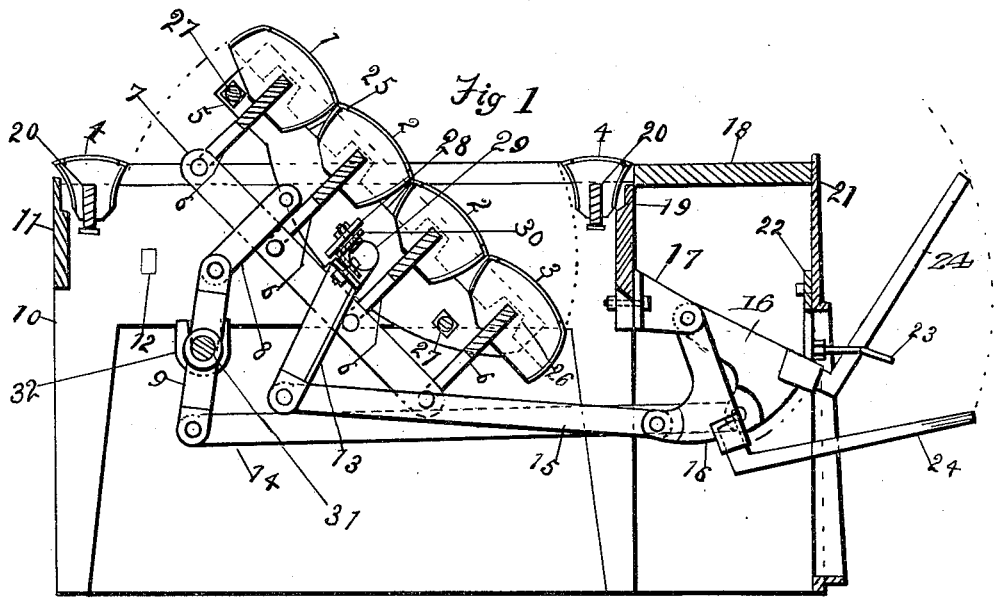
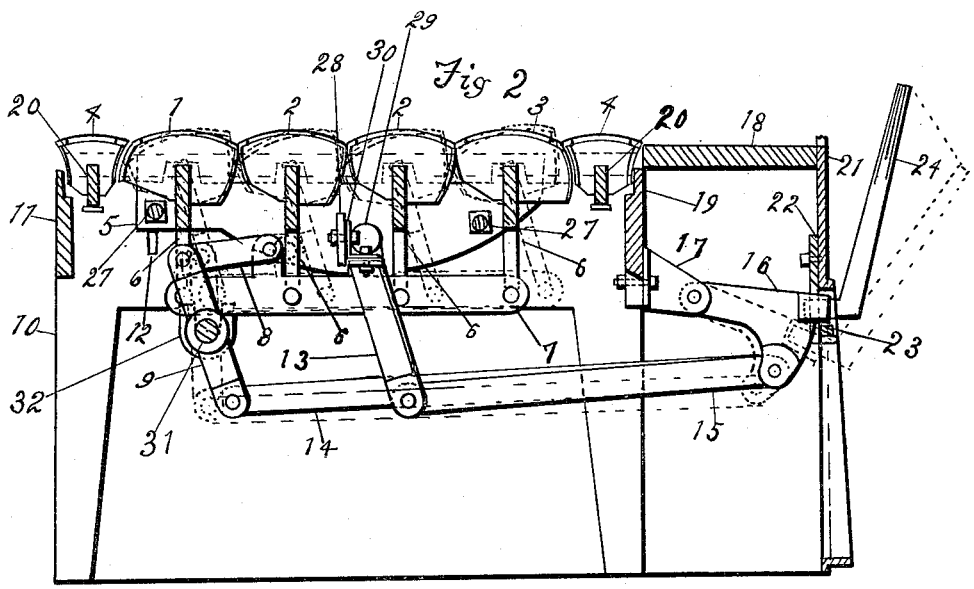
Witnesses
George W. Benton.
Robt. L. Christie
Inventor
Henry Benton

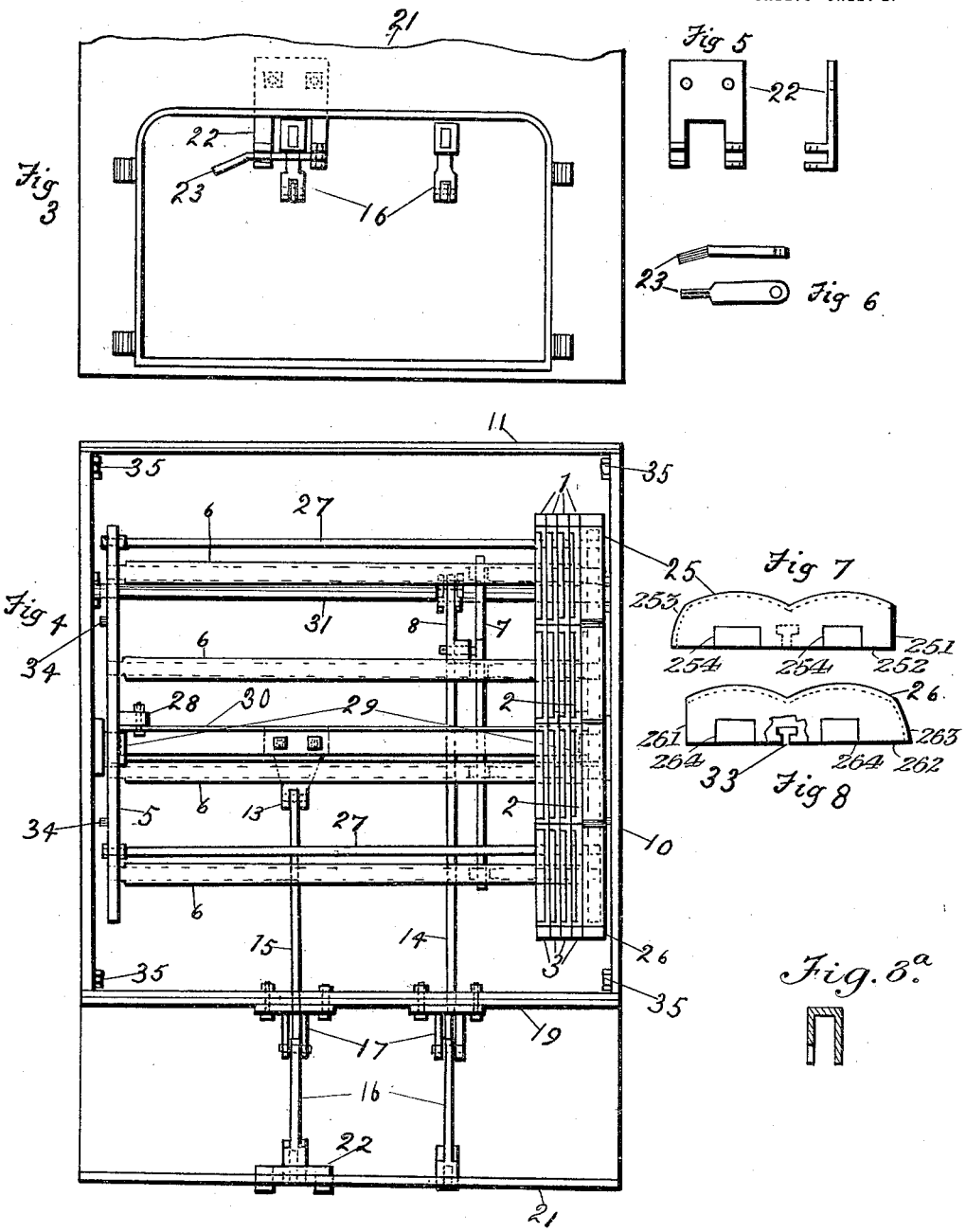

H. BENTON.
FURNACE GRATE.
APPLICATION FILED APR. 18, 1912.
1,139,097.
Patented May 11, 1915.
4 SHEETS—SHEET 3.
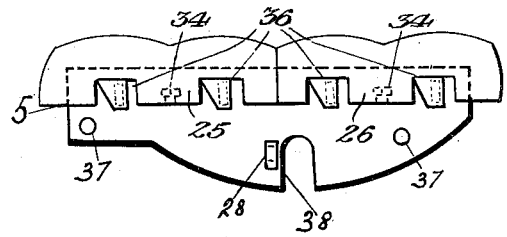
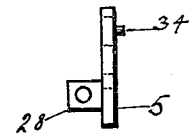
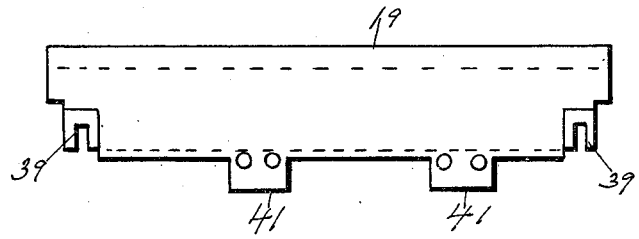
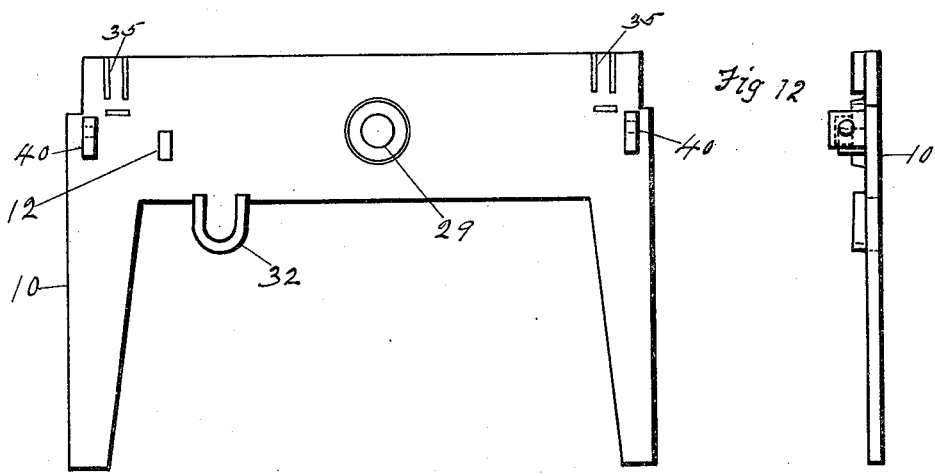
Witnesses
George W. Benton.
Robt L Christee
Inventor
Henry Benton H. BENTON.
FURNACE GRATE.
APPLICATION FILED APR. 18, 1912.
1,139,097.
Patented May 11, 1915.
4 SHEETS—SHEET 4.
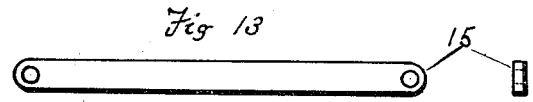
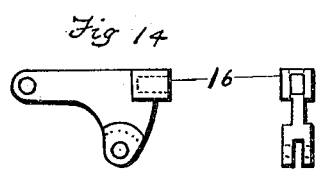
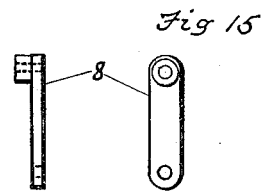
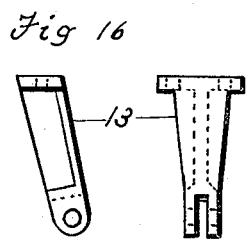
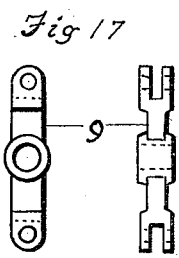
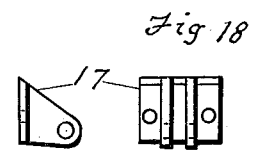
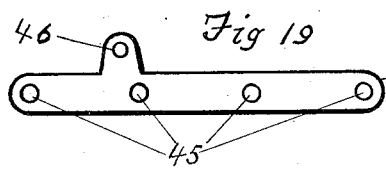
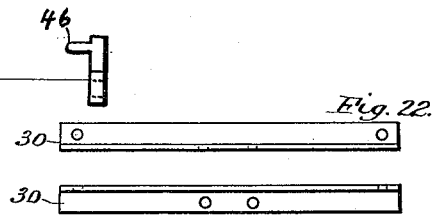
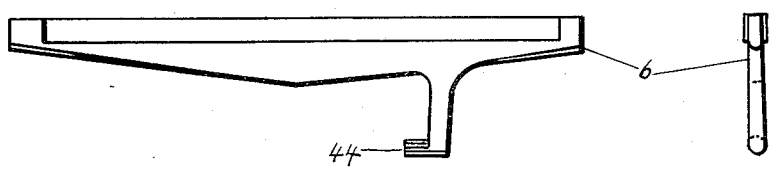
Witnesses
George W. Benton.
Robt. F. Christie
Inventor
Henry Benton

UNITED STATES PATENT OFFICE.

HENRY BENTON, OF ELIZABETH, NEW JERSEY.

FURNACE-GRATE.

1,139,097.   Specification of Letters Patent.   Patented May 11, 1915.

Application filed April 18, 1912.   Serial No. 691,693.

*To all whom it may concern:*

Be it known that I, HENRY BENTON, a citizen of the United States, residing at Elizabeth, in the county of Union and State of New Jersey, have invented certain new and useful Improvements in Furnace-Grates, of which the following is a specification.

This invention relates to a grate comprising a plurality of bars so arranged that either the grate can be tipped or dumped as a whole or the bars can be rocked or shaken upon their longitudinal axes in the grate frame, and the objects of the invention are to provide improved means for operating said grate in either of the two ways mentioned; to secure means for producing the two motions which shall not interfere one with the other in any way, and to do this by a novel construction which is simple and not liable to get out of order; to enable the operating means for producing both motions to be readily accessible through the ash pit door of the furnace and yet without materially obstructing said doorway or the ash pit, and to obtain other advantages and results as may be brought out in the following description.

Referring to the accompanying drawings, in which like numerals of reference indicate the same parts throughout the several views, Figure 1 is a vertical sectional view taken longitudinally of the fire box of a furnace embodying my invention and showing the grate in dumping position; Fig. 2 is a similar sectional view with the grate in normal position and showing in dotted lines the grate bars swung in rocked or shaking position; Fig. 3 is an elevation of the lower part of the front of the furnace, or view looking at the right hand side of Figs. 1 and 2; Fig. 4 is a plan of that portion of the furnace shown in Fig. 2, with some of the parts removed; Fig. 5 shows in front and side elevation a certain bracket for the lever for locking the dumping mechanism; Fig. 6 shows similar detail views of said locking lever; Fig. 7 is an inner side view of one of a pair of cradle guards; Fig. 8 is a similar view of the other cradle guard, partly broken away to show the T-slot more clearly; Fig. 8ª is a cross section of one of said cradle guards; Fig. 9 shows one of the end plates of a dumping grate section cradle, in inner side and end elevations, with the guards mounted thereon in the side view; Fig. 10 shows the front rail of the cradle supporting frame in front and end elevation; Fig. 11 shows the rear rail of the said frame in rear and end elevation; Fig. 12 shows one of the side pieces of the said frame, in inner side and end elevation; Fig. 13 is a detail view of a certain connecting rod in side and end elevation; Fig. 14 shows in side and end elevation one of the connecting rod arms used for shaking and dumping; Fig. 15 shows in side and edge elevation a certain shaking link; Fig. 16 shows in side and front elevation a dumping arm for operating the cradle; Fig. 17 shows in side and edge views a rocker arm for shaking the grate bars; Fig. 18 shows in side and front elevation one of the brackets for fulcrumally supporting the connecting rod arms; Fig. 19 shows in side and end elevation a coupler for connecting the several grate bars; Fig. 20 shows in side and end elevation one of the grate bars with the grate bar sections removed therefrom; Fig. 21 shows in side and end views a rocker shaft for the rocker arm; Fig. 22 is a front elevation of the angle bar connecting the end plates of the cradle: Fig. 23 is a plan of the same, and Fig. 24 illustrates one of the tie-rods for connecting said cradle and plates.

In the specific embodiment of the invention illustrated in said drawings, the reference numeral 10 indicates the opposite side pieces of a grate supporting frame, said side pieces being maintained in upright and parallel relation by front and rear rails 19 and 11, respectively, which extend between said side pieces 10 and are rigidly fixed thereto. As shown in the drawings, the front and rear rails are notched as at 39 to engage the side pieces 10, which are provided with lugs 40 for securing said front and rear rails thereto. At the front of the front supporting rail 19 is arranged a dead plate 18, here shown as horizontal and extending to the front housing 21 of the furnace, said housing having the usual opening for the ash pit doors at its bottom.

Between the front and rear supporting rails 19 and 11, in suitable recesses 35 on the side pieces 10 and extending from side to side of the furnace, are dead bars 20, 20 which are in such proximity to said front and rear supporting rails that the adjacent longitudinal edge of grate bar sections 4 mounted on the adjacent dead bar overlies each rail. A movable grate section is provided to close the remainder of the top of the fire box and form a bed for the fire, said movable grate section comprising a cradle having vertically arranged end plates 5, 5 adjacent the side pieces 10 of the supporting frame and notched as at 38 on their lower edges to take over studs 29 projecting inwardly from said side pieces 10 substantially midway between the front and rear ends thereof. Said cradle end plates 5 are furthermore connected by an angle bar 30 secured by its upright flange to lugs 28 on the cradle end plates 5 and having its other or horizontal flange projecting across the notches 38 below the studs 29, whereby the cradle is held positively upon said studs. As a further means for holding the cradle end plates 5, 5 in operative relation, I have shown tie rods 27, 27 one on each side of the angle bar 30 and spaced therefrom, said end plates being provided with suitable holes 37 to receive said tie rods. The said cradle is provided with a fire-supporting surface as hereinafter described, and in order to tilt the cradle to dump the fire, I secure to the angle bar 30 thereof, and preferably its lower or horizontal flange, a depending dumping arm 13 of sufficient length to afford the necessary leverage. On a pendant lug 41, see Fig. 10, on the front rail 19 of the supporting frame, I mount a forward projecting bracket 17 for pivotally supporting a connecting-rod arm 16, said arm being fulcrumed at its rear end and provided at its forward end with a socket for a removable lever or handle 24. It will be understood that the front end of the said connecting-rod arm is adjacent the ash pit door of the furnace preferably at the upper part thereof, but does not project therefrom so as to interfere with closing the door. Said arm 16 further has a downward extension or projection at its lower side, and to said extension or projection is pivoted a connecting rod 15 the other end of which is pivoted to the dumping arm 13, so that said connecting rod is disposed horizontally in the upper part of the ash pit, extending from front to rear of the furnace. Obviously as the operator swings the handle or lever 24 downward, (see Figs. 1 and 2), the connecting rod 15 is forced backward and the dumping arm 13 thereby swung back which necessarily tilts the grate cradle and movable grate section upon its trunnions 29, 29 for the cradle end plates 5, 5. By swinging the lever 24 upward again, the grate is brought back to normal position, and in order to prevent it from tilting past the horizontal, a lug 12 is provided on each of the side pieces 10 of the supporting frame in the path of the adjacent cradle end piece 5, so that said lugs act as stops for the cradle.

It is desirable to lock the dumping mechanism with the grate horizontal, so as to prevent inadvertent dumping of the fire, and to accomplish this I have shown on the front housing 21 of the furnace, see Fig. 3, a bracket 22, the lower end of which is provided with a slot into which the front or socketed end of the connecting-rod arm 16 will enter, when the said arm is swung upward. A locking lever 23 is mounted in suitable lugs on the bracket 22 and adapted to be swung across the path of said connecting-rod arm 16, below the same when in said slot in the bracket, so that when it is desired to dump the grate, said locking lever has first to be swung clear of the arm 16 before the dumping lever 24 can be swung down.

It is a feature of my invention to provide such a construction that the grate bars will retain their normal position during dumping of the grate as just described, and to provide means for shaking said grate bars when the cradle is in normal horizontal position, which means shall in no way interfere with the dumping action or disturb the grate bars during dumping. To this end I have provided the construction next to be described.

Adjacent the upper edge of each end plate 5 is a series of transverse apertures 36 for receiving the ends of grate bars 6 extending between corresponding apertures in said end plates and adapted to be rocked therein as hereinafter described, and to admit such rocking with minimum resistance, I preferably round or curve the under edges of said grate bars at their ends where they enter the apertures and bear upon the bottom thereof, (see Fig. 20). Each of said apertures has its top and bottom walls preferably parallel to the upper edge of the cradle end plate 5 and its front side wall or side wall next the front of the furnace toward which the cradle tilts in dumping adapted to contact with the adjacent side of the grate bar when said grate bar is in normal upright position with respect to the cradle; the opposite rear side wall of the aperture is inclined rearwardly upward, and so spaced from the front side wall as that the lower edge of the grate bar seats without undue lost motion between said side walls while there is considerable space between the upper edge of the grate bar and the rear side wall, so that said grate bar can be tipped rearwardly to lie against said rear side wall. By this construction the grate can be shaken by rocking the grate bars each from its normal position rearward and back again to normal position, and yet at the same time when the movable grate bar is tilted in dumping as shown in Fig. 1, there is no possibility of the grate bars tipping from normal position with respect to the cradle, because they are already seated against the walls of the apertures on the side toward which tilting or dumping occurs. I can therefore dump my improved grate without any danger of inadvertent shaking motion of the grate bars.

In order to rock the grate bars 6 in shaking, I provide a depending arm on each bar intermediate its ends and form on each of such arms a lateral stud 44 projecting longitudinally of the grate bar, see Fig. 20, and upon the several studs I mount a coupler 7 with suitable apertures 45 to receive said studs. Obviously, by reciprocating said coupler 7 the grate bars will be rocked correspondingly, and in order to do this I provide transversely below the coupler 7 a rocker shaft 31 suitably mounted in bearings 32 in the side pieces 10, 10 of the grate supporting frame. Upon said shaft 31 is a rocker arm 9 with a portion above and a portion below the shaft, and to the upper end of this rocker arm is pivotally connected a shaking link 8 the other end of which pivotally connects to a stud 46 projecting preferably upward from the grate bar coupler 7, as shown in Fig. 19. In normal position of the grate the rocker arm 9 and the shaking link 8 are preferably at about right angles, so that when the grate is dumped they will approach alinement and not disturb the grate bars at all. To the lower end of the rocker arm 9 is pivoted a connecting rod 14 the forward end of which is pivoted to a connecting-rod arm 16 similar to the corresponding arm which has been described for the connecting rod 15 of the dumping mechanism, said arms being arranged side by side as indicated in Fig. 3. It will be understood that a movement of a handle or lever 24 inserted in this connecting arm of the shaking mechanism, will cause a corresponding rocking of the grate bars 6 as indicated by dotted lines.

As clearly shown in Fig. 1, when the grate is dumped no movement of the grate bars with respect to the cradle can take place, because they are already seated against the front walls of the apertures in the cradle end plates 5, and the shaking link 8 takes up most of the tilting movement of the grate, any small portion which is communicated to the rocker arm 9 simply drawing the connecting rod arm 16 of the shaking mechanism slightly downward, which does no harm. The essential thing is to enable the grate to be dumped without disturbing the relation of the grate bars to the cradle or giving them any shaking action.

The grate bars may provide fire bearing surfaces in any desired way, but I prefer to employ and have shown grate bars adapted to receive upon themselves grate bar sections 1, 2, 3, which form the supporting surface for the fire, it being preferable to admit removal of said sections by sliding the same off the ends of said grate bars. In order (a) to prevent endwise displacement of the grate bar sections, (b) to prevent the grate bars from sliding in the cradles, and (c) to protect the cradle and plates 5 from the fire I provide guards 25, 26 which seat upon the upper edges of the end plates 5. I prefer to have these guards removable and yet provide means whereby they will not become dislodged or fall off when the grate is dumped, and to this end the construction is as follows:—For each side of the grate there is preferably a pair of guards 25, 26 made in rights and lefts, each of a hollow construction with one end 251 (or 261) and the bottom 252 (or 262) open and its other end 253 (or 263) closed. These guards are adapted to be set down over the upper edge of the cradle end 5, as shown in Fig. 9, with their open ends 251, 261 adjacent each other. Each guard has at its inner wall or wall next the grate bars recesses 254 (or 264) adapted to allow the guard to pass down over the grate bars, the outer wall being solid or entire whereby the apertures 36 in the cradle plate are closed and the grate bars prevented from shifting longitudinally. Furthermore, each guard has extending upward from the lower edge of its outer wall a T-slot 33 adapted to receive the studs 34 on the outside of the cradle end plate, said studs when the guards are in final position lying in the transverse portion of the slot at the end thereof away from the front of the furnace or edge of the grate section which tips downward in tilting. This prevents the guards from sliding off when the cradle is tipped into dumping position, and thus they remain securely upon the cradle during all ordinary use of the guard, covering the aperture 36 on the outside of the cradle and holding the grate bars against longitudinal movement. At the same time, the guards can be readily removed, when desired, to allow the grate bars to be removed or for any other purpose, but they cannot become inadvertently dislodged in dumping the grate. These features are to be specifically claimed in a divisional application, and thus do not need to be further described here.

Having thus described the invention, what I claim is:—

1. The combination of a supporting frame, a cradle pivotally mounted in said frame, means for rocking said cradle, grate bars rockingly mounted in said cradle with depending arms, a link connecting said arms transversely thereof, a rocking shaft mounted in said frame longitudinally of said grate bars beneath the same and said link, an upwardly projecting arm on said rocking shaft, a second link connecting said first-mentioned link and the said rocking shaft arm and normally lying substantially horizontal and parallel to said first-mentioned link above the same, and means for rocking said rocking shaft.

2. The combination of a supporting frame, a cradle pivoted in said frame, means for rocking said cradle, grate bars pivotally mounted in said cradle each with a depending arm, a link connecting said arms transversely of the grate bars and having an upwardly projecting stud, a rocking shaft mounted in said frame longitudinally of said grate bars beneath the said link, a rocker arm fast on said shaft projecting both upwardly above the said link in its normal position and downwardly from the rocking shaft, a second link pivoted at its opposite ends to the upper end of said rocker arm and the stud on the link respectively and thus normally lying wholly above the first-mentioned link, and means connected to the lower end of said rocker arm for rocking the grate bars.

3. The combination of a supporting frame, a cradle pivoted intermediate its ends in said frame adapted to swing from substantially horizontal position upward at its rear end into inclined position, grate bars pivotally mounted in said cradle each with a depending arm, a link connecting said arms transversely of the grate bars and having an upwardly projecting stud, a rocking shaft mounted in said frame longitudinally of said grate bars beneath the said link and in the rear of the pivotal mounting of said cradle, a rocker arm fast on said shaft projecting both upwardly above the said link in its normal position and downwardly from the rocking shaft, a second link pivoted at its opposite ends to the upper end of said rocker arm and the stud on the link respectively and substantially horizontal in normal position thus normally lying wholly above the first-mentioned link, and means connected to the lower end of said rocker arm for rocking the grate bars.

In testimony whereof, I affix my signature in presence of two witnesses.

HENRY BENTON.

Witnesses:
 ROBT. S. CHRISTIE,
 GEORGE W. BENTON.

Copies of this patent may be obtained for five cents each, by addressing the "Commissioner of Patents, Washington, D. C."